(12) United States Patent
Lahoui et al.

(10) Patent No.: US 9,705,191 B2
(45) Date of Patent: Jul. 11, 2017

(54) METHOD FOR PRODUCING RADIOFREQUENCY COMMUNICATION DEVICES WITH OR WITHOUT OPERATION SWITCH AND DEVICES THUS OBTAINED

(75) Inventors: Nizar Lahoui, Aubagne (FR); Frédérick Seban, Cassis (FR); Jean-Christophe Fidalgo, Gemenos (FR); Jean-Luc Meridiano, Tourves (FR)

(73) Assignee: GEMALTO SA, Meudon (FR)

( * ) Notice: Subject to any disclaimer, the term of this patent is extended or adjusted under 35 U.S.C. 154(b) by 2446 days.

(21) Appl. No.: 12/521,499

(22) PCT Filed: Dec. 20, 2007

(86) PCT No.: PCT/EP2007/064317
§ 371 (c)(1),
(2), (4) Date: Apr. 16, 2010

(87) PCT Pub. No.: WO2008/080876
PCT Pub. Date: Jul. 10, 2008

(65) Prior Publication Data
US 2010/0197245 A1    Aug. 5, 2010

(30) Foreign Application Priority Data

Dec. 28, 2006 (EP) .................................... 06301302

(51) Int. Cl.
H04B 1/06 (2006.01)
H01Q 7/00 (2006.01)
(Continued)

(52) U.S. Cl.
CPC ......... *H01Q 7/00* (2013.01); *G06K 19/07345* (2013.01); *H01H 13/88* (2013.01);
(Continued)

(58) Field of Classification Search
CPC ........... G06K 7/10722; G06K 7/10792; G06K 7/10712; G06K 7/10851; G06K 7/12
(Continued)

(56) References Cited

U.S. PATENT DOCUMENTS 6,268,796 B1 * 7/2001 Gnadinger ......... G06K 19/0726
257/673
7,151,455 B2 * 12/2006 Lindsay ............. G06K 19/0717
340/539.26

(Continued)

FOREIGN PATENT DOCUMENTS

DE           101 40 662 C1      3/2003
DE   10 2005 020 092 A1      11/2006
(Continued)

OTHER PUBLICATIONS

International Search Report (PCT/ISA/210) dated Feb. 4, 2008.
Written Opinion (PCT/ISA/237) dated Feb. 4, 2008.

*Primary Examiner* — Ajibola Akinyemi
(74) *Attorney, Agent, or Firm* — Buchanan Ingersoll & Rooney PC

(57) ABSTRACT

A device according to claim 6, characterised in that the interrupting zone is positioned outside the switch zone in which two wires (54, 56) of a circuit are so arranged as to cooperate with the switch are positioned.

10 Claims, 2 Drawing Sheets

(51) Int. Cl.
  *G06K 19/073* (2006.01)
  *H01H 13/88* (2006.01)
  *H01Q 1/22* (2006.01)
  *H01Q 1/40* (2006.01)
(52) U.S. Cl.
  CPC .............. *H01Q 1/22* (2013.01); *H01Q 1/40* (2013.01); *H01H 2203/038* (2013.01); *H01H 2205/03* (2013.01); *H01H 2231/05* (2013.01)
(58) Field of Classification Search
  USPC ........................................................ 455/269
  See application file for complete search history.

(56) References Cited

U.S. PATENT DOCUMENTS

| | | | | |
|---|---|---|---|---|
| 7,503,491 | B2 * | 3/2009 | Zhu | G06K 19/07749 235/451 |
| 2002/0008690 | A1 * | 1/2002 | Cooper | G06F 3/0238 345/156 |
| 2005/0007296 | A1 * | 1/2005 | Endo | G06K 19/0726 343/895 |
| 2006/0022886 | A1 * | 2/2006 | Hein | B82Y 25/00 343/787 |
| 2007/0267506 | A1 * | 11/2007 | Bashan | G06K 19/0726 235/492 |
| 2007/0290856 | A1 * | 12/2007 | Martin | 340/572.3 |
| 2009/0315320 | A1 * | 12/2009 | Finn | B32B 37/1207 283/107 |
| 2011/0095890 | A1 * | 4/2011 | Bayley | G06K 19/0723 340/572.1 |

FOREIGN PATENT DOCUMENTS

| | | | |
|---|---|---|---|
| EP | 1 544 787 A1 | 6/2005 | |
| EP | 1544787 A1 * | 6/2005 | ........... G06K 19/077 |

\* cited by examiner

METHOD FOR PRODUCING RADIOFREQUENCY COMMUNICATION DEVICES WITH OR WITHOUT OPERATION SWITCH AND DEVICES THUS OBTAINED

The invention relates to a method for producing radiofrequency communication devices with or without a switch preventing the reading of the device without the carrier knowing it, as well as the devices obtained.

The devices firstly concerned by the invention are chip cards of the contactless type or hybrid type, inserts including a radiofrequency antenna or possibly for any antenna circuit support such as electronic passports. Such radiofrequency communication devices also called transponders, and most of them meet the ISO-IEC 14443 or ICAO DOC 9303 standard.

This device is intended to supply the carrier of the transponder means for accepting and/or refusing the access to data contained in said transponder of an external reading device. As a matter of fact, one of the problems raised by contactless transponders and more particularly for sensitive applications such as a bank card, an electronic purse, an e-passport, identification cards results from the fact that the transponder can be interrogated by a remote reader and this operation can be carried out even though the carrier does not know it.

One of the means making it possible to remedy this drawback is using a switch. This efficient means is not applicable to antennas, the lines of which are below a certain width (1 mm). Thus it is difficult to set up contacts with a switch on antennas having an embedded wire or a conductive wire fixed by embroidery or the like. Now today, the utilization of such conductive wires is preferred to comply with the various standards all the more so as these devices are more and more reduced in dimensions.

Such conductive wires, generally made of copper, are very thin, of the order of 113 μm and separated in particular by 700 μm to make antenna turns, and make it possible to obtain a high quality factor for example above 44, contrarily to antennas obtained by depositing conductive matter more particularly through screen printing with a conductive ink. The diameter of the turns can be for example from 200 μm to 300 μm. The spacing between the turns of an antenna can be from 150 μm to 1.5 mm with the measurement being made in the middle of the wire.

In addition, the modification in the present card manufacturing technology implies changing the process which might cause a lot of constraints.

The second drawback of the process used today in the card with a switch is the modification in the path or the arrangement of the antenna provided with a portion of open circuit to accommodate the switch.

The present method does not make it possible to test the operation of the card before adding the button or whether the antenna circuit is open. In addition, it imposes a new arrangement of the antenna turns, a new product and thus new stock management constraints.

The aim of the invention is to solve the above-mentioned drawbacks and to give more flexibility to the production and the operation test.

In its principle, the invention consists in adding in series, at the antenna, a conductive loop or a circuit portion remote from normal or regular turns; thus it is possible to obtain cards or inserts which can be used either with an inhibition/authorization means in the form of a button, or as standard contactless cards.

In addition, adding a conductive portion at a distance from the turns has almost no influence on the radiofrequency properties of the card obtained.

If a button is desired, the operation of which authorizes the communication on the card, a machining step is then necessary for uncovering, and giving access to, a contact zone and providing an open circuit on which a switch is positioned in the form of a push button. In the opposite case, in a simplified version without a switch, the card will remain operational independently of the carrier's authorization.

The solution provided here has the advantage of using a button with all the present technologies of the production of contactless inserts (or inlays). The solution is compatible with standardized chip card manufacturing methods.

The first object of the invention is thus a method for reducing a radiofrequency communication device including an electronic component, an antenna circuit associated with the electronic component and a switch on the circuit capable of switching off the antenna circuit;

The method is differentiated in that it comprises the following steps:
  the antenna is made with a portion in the form of a closed circuit in a reception zone of the switch,
  an interrupting zone of the antenna circuit is created on said portion at least by removing matter from the antenna.

This manufacturing method has the advantage of using common inserts as a device with or without this switch.

It also makes it possible to electrically test the insert or to load data into the insert at a much advanced stage of the device manufacturing process. Whereas in the prior art, the button must be available and it is necessary to press it to enable the operation.

Another object of the invention is also a radiofrequency communication electronic device including an electronic component, an electric antenna circuit connected to the electronic component and a switch position on the antenna circuit and capable of switching off the antenna circuit when operated.

The device can be differentiated in that it includes an interrupting zone of the antenna circuit created by removing matter from the antenna.

This structure of a radio-frequency communication device with a switch results from the implementation of the method according to the invention. The device more particularly includes traces showing that matter has been removed from the antenna at the switch, which makes it possible to obtain an open circuit.

Another object of the invention is a device having a support and a switched off antenna circuit having turns with two connecting ends for a connection to an electronic component, positioned on the support with a regular inter-turn spacing.

It can be differentiated in that the antenna includes a portion of the turns which has a length above 10 mm, extending completely at a distance of at least 10 mm from the coil regular path, and the ends for the connection to an electronic component.

This structure has the advantage of being suitable for a common antenna support which can be used with or without a switch, the preferred dimensions of which in width or in diameter are of the order of 10 mm.

Other characteristics and advantages of the invention will appear more clearly when reading the description given as a non-limitative example and referring to the appended drawings wherein.

Figure 1:
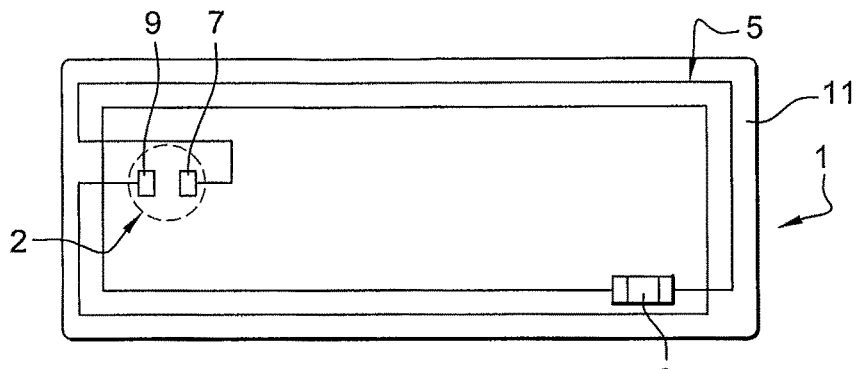
FIG. 1 is a diagrammatic illustration of a radio-frequency transponder intended to receive a switch and including an antenna made according to the prior art.

In FIG. 1 is illustrated the embodiment according to a prior art of the radio-frequency communication device 1 or transponder which includes an electronic component 3, an antenna circuit 5 associated with the electric component 3 and a reception zone Z of a switch on the circuit capable of switching off the antenna circuit, which is open at this level.

The antenna circuit includes, as from its manufacturing on a support 11, two openings respectively for the connection to the electronic component and for an interaction with a switch (not shown). Contact pads or studs 7, 9 are provided on the antenna turns at the position of the switch.

This device has a drawback in that it cannot be operated in an intermediary condition which would not include a switch switching off the circuit at the contacts 7 and 8, and allowing the operation thereof.

Figure 2:
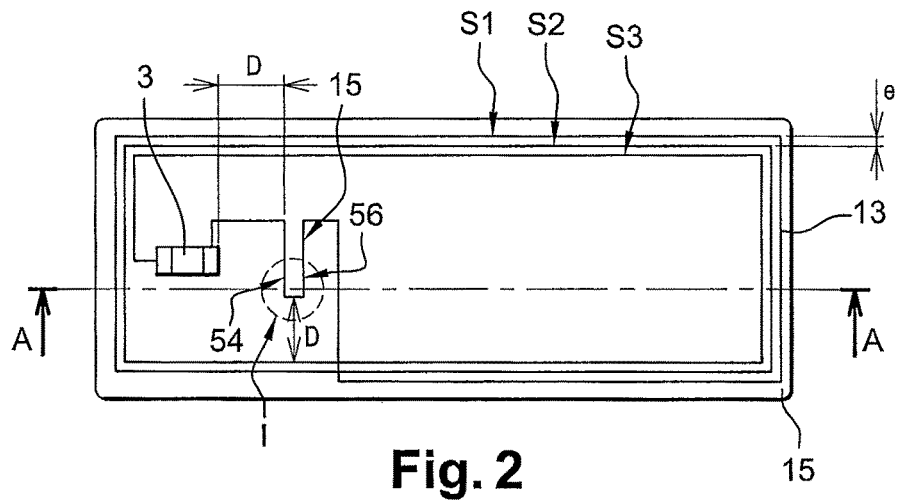
FIG. 2 illustrates a transponder obtained according to an implementation of a method according to the invention.

FIG. 2 illustrates a radio-frequency device in the form of an insert for contactless chip card obtained by an implementation of the method according to the invention. The method includes a first step during which the antenna 13 is created in the form of a closed circuit (except for the antenna interconnected with the electronic component). The antenna 13 is at least in a closed circuit at one zone (I) which can receive a switch.

The antenna has 3 wires S1, S2, S3 having a regular spacing (e) determined at 700 μm. Regular spacing means a substantially constant spacing between the turns. The turns altogether form a coil having a regular path with an inter-wiring spacing smaller than or equal to 2 mm or even 3.5 mm. The turns have for example a diameter between 50 and 300 μm and are sheathed with an insulating material.

For an easier implementation, the turns are generally positioned parallel and regularly spaced with respect to each other but a substantially variable spacing cannot be excluded.

In the example, the wire is embedded in a polymer support 11 using ultrasounds. But it could be created in another way, using any known technique such as etching and electro-chemical deposition, cutting of a metal sheet. The support can be made of various materials more particularly synthetic materials and/or include cellulosic matter fibers such as paper.

According to a preferred embodiment or implementation, the antenna includes a portion 15 positioned at a distance from the turns and which does not follow a normal or regular path formed by the other turns. Thus, the portion 15 deviates from the normal path without any obvious reason instead of, for example, connecting a component.

This portion of an antenna is, in the example, positioned outside the regular path thereof forming the coil and is more particularly positioned at the periphery of the support. The portion 15 is distant both from the regular path thereof and the connecting ends by a distance D. This distance D is preferably above 10 mm, or even above 15 mm or 20 mm. But it could be reduced depending on the overall dimension of the switch, for example 5 to 10 mm.

In the example, the continuous and switched off turn portion has a length (L) above 10 mm is completely distant from its inter-turn spacing (e). In the example, a portion above 20 mm of the antenna turn is derived from the normal coil path in the form of a loop or a "U". The card has the ISO format of 54 mm×76 mm.

The portion 15 may include two branches (54, 56) opposite each other, for example in the form of a "U" or a "V" and distant by a length between 1 and 10 mm depending on the width of the conductive element 19 of the switch.

Figure 3:
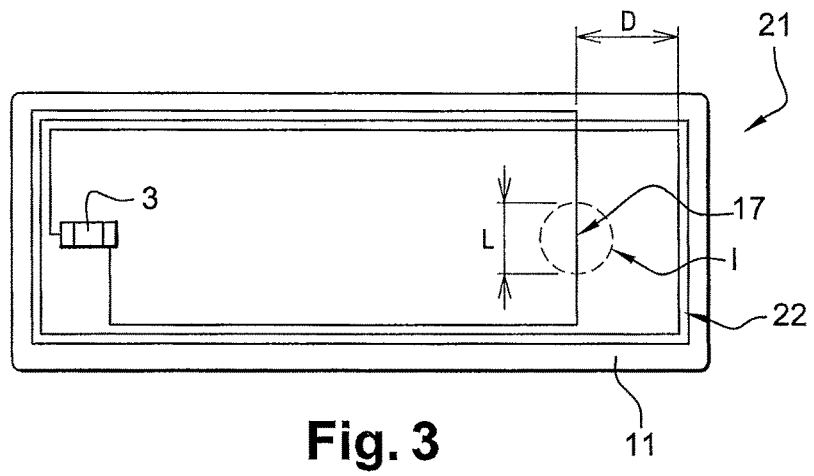
FIG. 3 illustrates another transponder obtained according to a second implementation of the method according to the invention.

In another implementation of the method and an embodiment of the device 21 in FIG. 3, the antenna is substantially rectangular with a small side 22 and the antenna portion 17 is parallel with this small side and extends transversally across the surface of the support 11 at a distance D from the side edge.

The circle in dotted lines illustrates the position of a zone (I) intended for receiving the switch or to be machined.

Figure 4:
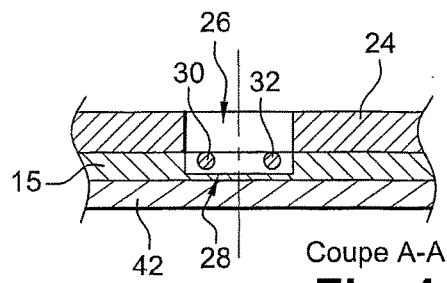
FIG. 4 illustrates a partial cross-section of FIG. 2 along axis A-A at the zone (I) after a first step of removing matter from the antenna.
Figure 5:
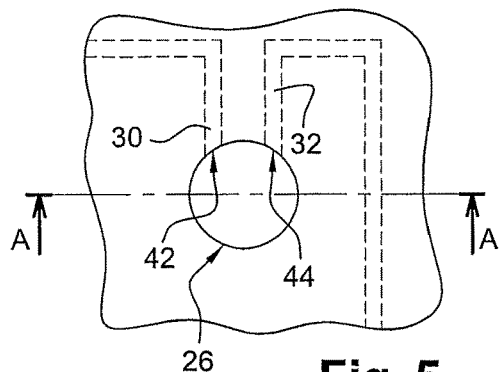
FIG. 5 illustrates a top view of the preceding figure.

In FIGS. 4 and 5, according to another step of the method, an interruption zone of the antenna circuit is created on a portion 17 of the antenna circuit at least by removing matter from the antenna. To open the antenna circuit, the antenna must at least be completely cut. Preferably, matter is removed from the antenna with matter from the support located there-under.

This step is carried out after the connection of the component so as to be able to test the device beforehand. But it could be carried out beforehand if necessary, in which case the advantage of a common support for two different utilizations would still remain. The component in the example includes an integrated circuit connected to the antenna.

In the example, matter is removed after the deposition of a protective or coating layer 24 on the antenna circuit and the component 3.

For removing matter, a first machining of a cavity 26 is carried out through the top sheet, so as to create a bottom 28 in the cavity below said portion or antenna plane, until the antenna portion is completely cut, so as to form two free ends 30, 32 and thus a circuit which is open at this level. The machining includes a cutting operation more particularly one of milling, punching or drilling.

Figure 6:
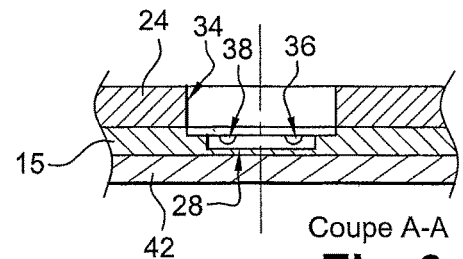
FIG. 6 illustrates a partial section of FIG. 2 along axis A-A at zone (I) after a second step of removing matter from the antenna.
Figure 7:
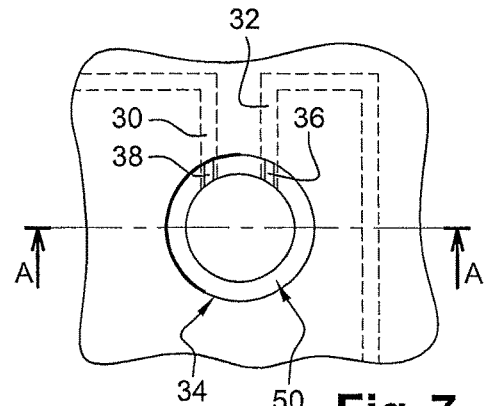
FIG. 7 illustrates a top view of the preceding figure.

In FIGS. 6 and 7, the method further includes the machining of a second cavity 34 which is wider than the first one 26, so as to uncover superficially both conductive free ends of said antenna portion and show contact zones 36, 38 oriented towards the outside of the cavity. This second machining is not so deep, it simply uncovers radially the wires at this level and thus these have each a bare surface 36, 38 oriented towards the inlet of the cavity.

If need be, conductive matter is preferably positioned on the thus uncovered and machined antenna turn parts 36, 38 so as to make, on the one hand, the electric contact with a switch short-circuit element easier, through an additional thickness, but also to prevent oxidation or corrosion, if any, which would prevent the setting up of a correct electric contact. Matter is preferably elastic at room temperature to dampen the contact with the switch and facilitate the contacts. It may include for example a conductive polymer.

Figure 8:
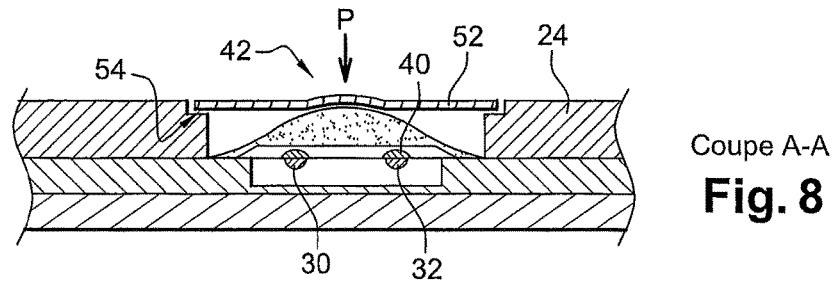
FIG. 8 illustrates a cross-sectional view of the switch positioned in the cavity created according to one implementation of the invention.
Figure 9:
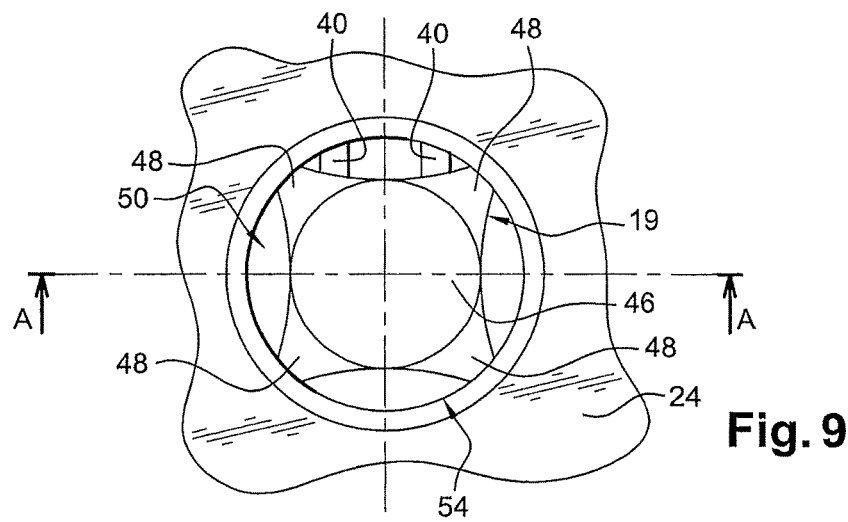
FIG. 9 illustrates a top view of the preceding figure.

Then, in FIGS. 8 and 9, according to a step complying with an implementation of a method according to the invention, a switch 42 is positioned on the antenna circuit in the switch reception zone, so as to switch off the antenna circuit. In the example, a short circuit conductive elastic element 19 is positioned so as to short circuit or to put in contact both said conductive free ends 30, 32, when operated or when a pressure P is exerted on the element 19.

The element is here a Belleville type washer including a central dome 46, connected to four stems 48 in the form of a resilient tab. The stems rest on the plane 50 of the second machining and, when pressed, the tabs get elastically deformed and the dome which collapses short circuits both free ends 30, 32 which are exposed in the cavity or put then in electric contact.

Other elements for providing the contact and switching off the circuit, more particularly spring elements, may be suitable. A washer can be totally round, i.e. without any stem. This means that the machining of the cavity is substantially different. On the one hand, the centre of the $2^{nd}$ plane in the cavity is different from that of the first plane. The washer can be positioned on a $3^{rd}$ slightly less deep plane (delta~wire radius+50 μm) than the $2^{nd}$ one, in order to prevent a short circuit and the cutting of the wire over time.

Finally, a flexible cap or membrane 52 which is accessible from the outside is fixed, more particularly by gluing on a third plane 54 machined above the conductive element while closing the cavity.

In an alternative embodiment of the device which is not shown, the antenna includes, in the interrupting zone, the turns positioned more particularly by embroidery above the surface of the support thereof, for example a fibrous or woven support. Then, a top sheet including a cavity is positioned above the antenna so that the contacts 30, 32 are positioned in the cavity. If need be, the sheet can include the membrane or cap and/or a short circuit element which would facilitate the assembling of the antenna support part with a support part for switching or short-circuit means.

As an alternative, the device, the card or the insert are made with the button covering a portion of a closed circuit or continuous circuit and the opening on the circuit is created for example by drilling via the back face, which is the face opposite the one including the button. A final coating sheet closes the orifice thus created.

According to another alternative, the sectioning of the antenna can be obtained by a first pressure on the button. Therefore, the button would include means for cutting the circuit at a previously embrittled place; for example the circuit can, very locally, have no support at the embrittled place (for example, 2×2 mm), more particularly by forming a bridge above a drilling in the support. The button may include a wire or a blade which could slide in the drill in order to cut the circuit.

The step of the opening can be carried out in the interrupting zone; however, it can be carried out outside this zone, for example through a pre-cut in the support or outside a finished or standardized surface of the support, awaiting the sectioning by a pressure of fingers and any other means, and the portion can extend for example up to the edge of the device, or a corner or beyond an edge intended to be the final one.

The advantage of these two embodiments is that they allow as late as possible an operation test, more particularly until the first utilization of the device.

The radio frequency communication electronic device thus obtained includes an antenna circuit interrupting zone created by removing matter from the antenna. In the example, this is a contactless bank card. However, this could be an insert for a passport or an identification card or any other document.

According to features of the invention, the radiofrequency communication electronic device obtained includes a first cavity 26 with a bottom 28 which extends through at least one top sheet 24. The bottom is positioned below said antenna portion or antenna plane.

Both free ends 30, 32 for the contact with the antenna open into the cavity and each has a substantially transversal or oblique section 42, 44 flush with the internal wall 26 of the cavity. The ends have the same profile as the cavity and thus are circular or cylindrical. The intersection of the wires with the cavity is here a cylindrical surface. It can be plane if the intersection corresponds to a plane (in the case of a parallelepiped cavity).

On the other hand, it can be seen that the device of the invention of FIG. 2 or 3 can be used in two applications with or without a switch; the insert includes on a support 15, a switched off antenna circuit with turns having two connecting ends for a connection to an electronic component.

The connection of the component can be obtained on the insert 21 then the insert can be used as such or can undergo other finishing steps such as a lamination of coating and/or decorating sheets 42 so as to form a contactless chip card with an antenna or even a contact type card or a contactless card with a specific module including contact path flush with the surface of the card body in addition to the contacts for the connection to the antenna.

The invention can be applied to any conductive circuit in which the circuit is mechanically opened at the switch after providing a continuous circuit at this place. Thus, the circuit can have another shape than in antenna coil or an antenna connection track.

In addition, in the example of FIG. 2, the loop end is in the cavity but in an alternative solution this end could be positioned outside the cavity or the switch zone or even outside the standard surface of the card. Consequently, the loop would be remotely opened at a certain distance from the switch.

In this case, two continuous wires of the loop would go through the cavity, with the two circuit wires being so arranged as to cooperate with the switch for switching off the circuit

The invention claimed is:

1. A method for producing a radiofrequency communication device including an electronic component, an antenna circuit associated with the electronic component and a switch on the circuit capable of switching off the antenna circuit, said method comprising the following steps:
   forming the antenna with a portion in the form of a closed circuit in a reception zone of the switch, and
   creating an interrupting zone of the antenna circuit on said portion by removing matter from the antenna.

2. A method according to claim 1, wherein the removing of matter from the antenna is carried out after the component is connected.

3. A method according to claim 1, wherein the removing of matter is carried out after the positioning of a coating layer on the antenna circuit and the component.

4. A method according to claim 3, wherein said method further comprises: removing matter by first machining a cavity through a top sheet so as to:
   create a first cavity bottom below said portion or a lower plane of the antenna, and completely cut the portion of the antenna to form two conductive free ends.

5. A method according to claim 4, further including the following steps:
   machining a second cavity, wider than the first cavity, by superficially uncovering the two conductive free ends of said portion of the antenna to show contact surfaces oriented towards the outside of the cavity,
   positioning a resilient short-circuit conductive element to short-circuit the two conductive free ends,
   fixing a flexible cap above the resilient short-circuit conductive element, closing the cavity and being accessible from the outside.

6. A radiofrequency communication electronic device including an electronic component, an electronic antenna circuit connected to the electronic component and a switch positioned on the antenna circuit and capable of switching off the antenna circuit when activated,
   wherein the antenna circuit includes an interrupting zone obtained by removing matter from the antenna, and
   wherein said interrupting zone comprises a first cavity, extending through a top sheet, having a bottom positioned below said antenna or a lower antenna plane, and said first cavity having two free ends of said antenna being flush with the wall of the first cavity.

7. A device according to claim 6, wherein the interrupting zone is positioned outside a switch zone in which two circuit wires are positioned so as to cooperate with the switch.

8. A device having a support and a switched off antenna circuit having turns with two connection ends for a connection to an electronic component, said turns being positioned on the support with a regular inter-turn spacing,
   wherein the antenna includes a portion of a turn over 10 mm in length and positioned at a distance of at least 10 mm away from the other turns and from the two connection ends for the connection to the electronic component.

9. A device according to claim 8, wherein said portion includes two branches separated by a distance of 1 mm to 10 mm.

10. A device according to claim 9, wherein said portion is substantially U-shaped.

* * * * *